United States Patent Office 3,463,317
Patented Aug. 26, 1969

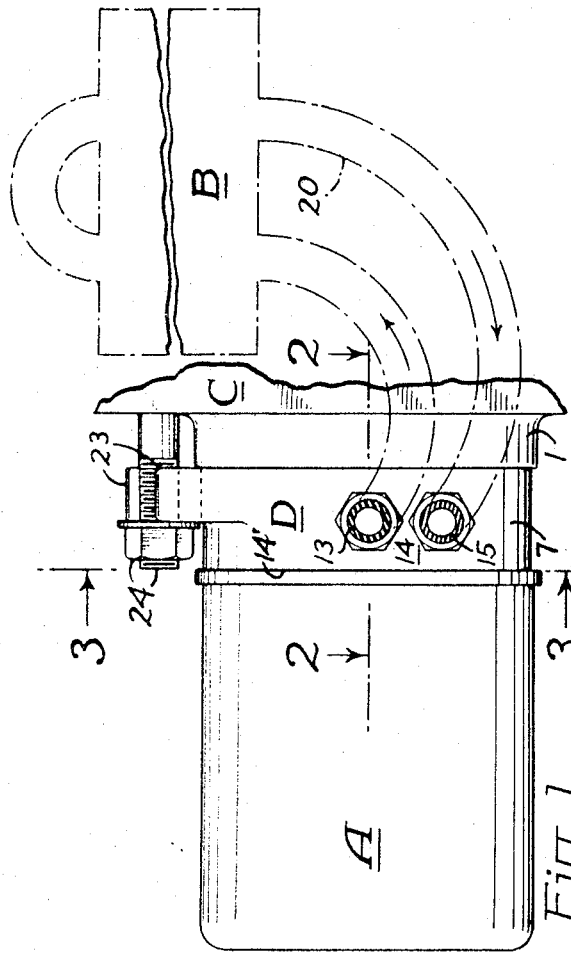
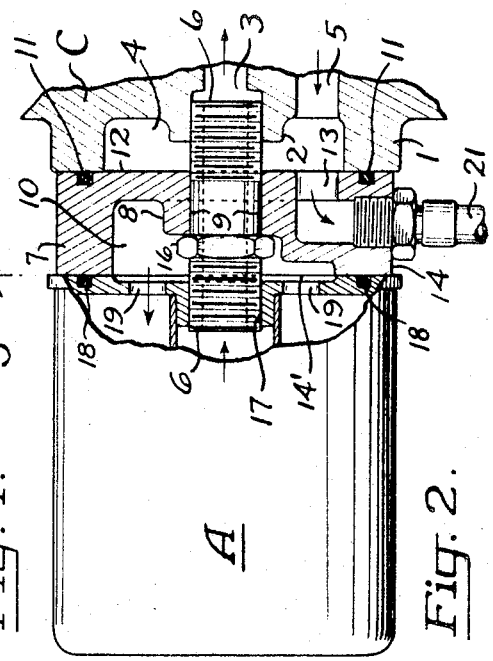
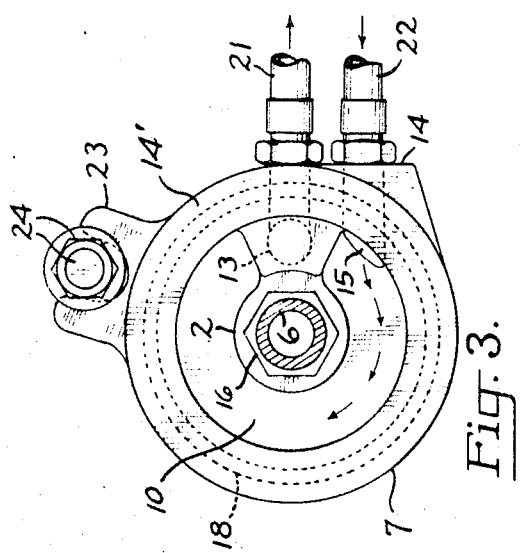
Fig. 1.
Fig. 2.
Fig. 3.
Walter R. Prier
INVENTOR
BY Samuel Jacobson
Atty.

3,463,317
ADAPTER UNIT FOR A FLUID FILTER AND A
FLUID COOLER
Walter R. Prier, 7245 SW. 82nd Ave.,
Portland, Oreg. 97223
Filed Aug. 7, 1967, Ser. No. 658,724
Int. Cl. B01d 35/18
U.S. Cl. 210—152                                      1 Claim

ABSTRACT OF THE DISCLOSURE

An adapter unit for a fluid filter for attachment thereto of a fluid cooler.

This invention relates generally to filtering hydraulic and/or lubricating fluids of engines, associated units thereof, and hydraulic assemblies and cooling the fluids within accepted tolerances for the efficient operation of such engines or systems. This invention particularly relates to means by which fluid in the rear axle casing used for lubrication of its contents and as a part of an hydraulic system, which formerly was only filtered by a screw type of filter, can be cooled as well by the interposition of the adapter unit embodying my invention.

By way of preface, it is pointed out that cooling and filtering fluids in hydraulic or other fluid or oil systems is not new. Filters have been a common adjunct to internal combustion engines, and in relative recent times coolers have also become standard equipment. Many vehicles are provided with factory installed systems by design and as a part of the machine. However, there are many types of vehicles on the market today that are provided only with a filtering system. Furthermore, many small units such as garden tractors, lawn mowers, tillers, golf carts, etc., with a closed fluid system, are used in warm weather and/or at the peak of their rated capacity, but are only provided with a filter. As a consequence, the fluid loses its viscosity and the moving parts overheat, affecting the efficiency, often causing breakdowns or damaging the unit and frequently freezing the parts so that the operation ceases until the unit cools off.

Since normally no provision for cooling overheated fluids is available on small hydraulic or other types of fluid systems, although it is considered efficacious for efficient operation, but most such systems do provide for filtering the fluid. An adapter unit is provided, which can be combined with a standard screw filter in order to permit the easy attachment of a cooling unit in combination with the filter.

Those familiar with the overheating problems in hydraulic and lubricating systems have come to recognize that it is essential to the efficient operation of these systems, to require the provision of some means of cooling the system. In most recent internal combustion engine, the manufacturer has provided filtering and cooling means. However, older engines and smaller combustion units are only provided with a filtering system.

The invention consists of an adapter unit which makes it possible, in any closed fluid system employing a spin-on type of filter to add a cooling device to an existing filtering unit without altering the filtering unit, nor the fluid reservoir or casing to which the filtering unit is usually attached.

The primary object of my invention is to provide a supplemental device or adapter unit between a filter and a fluid reservoir so as to permit the attachment thereto of a cooler, such as a radiator, and thereby create an integrated compact and relatively inexpensive filtering and cooling assembly without requiring alteration of the filter nor the wall of the unit to which it is attached, and thereby assure a constant supply of fluid within a safe temperature under the most adverse operating conditions.

Another object of my invention is to permit replacement of the oil filter and/or cleaning of the cooler without removal of the adapter unit embodying my invention after it has been secured to the casing or other appropriate portion of the vehicle or motor unit.

The foregoing disclosure of the filtering and/or cooling system employed in engines of units of all types requires no detailed description nor drawing to facilitate the understanding of my invention except such portion thereof as will aid in describing its use in adapting existing structural features including filters to make available cooling means therefor, and those skilled in engine art are quite familiar with the constructional details of the filters and coolers.

The invention will be clearly defined in the following description when considered in connection with the accompanying drawing, in which like parts are identified by similar reference characters, wherein:

FIG. 1 is an elevational view illustrating the adapter unit embodying my invention positioned in place between a representative type of screw filter and a fanciful representation of a fluid reservoir casing with a representative type of fluid cooler being diagrammatically illustrated only in so far as is deemed necessary to show its relation to the adapter unit;

FIG. 2 is an elevational view, partly in section, taken on line 2—2 of FIG. 1, showing the structural characteristics of the adapter unit and its operating relation with the fluid reservoir casing, filter and cooler, the arrows illustrating the flow of the fluid through the adapter unit and the members attached to it; and FIG. 3 is an end view of the adapter unit taken on line 3—3 of FIG. 1 and the modified connecting nipple being shown in cross section.

In FIG. 1 of the drawings, the filter element is generally designated by reference character A, the cooler element by reference character B, the diagrammatically disclosed fluid casing by reference character C, and the adapter unit embodying my invention by reference character D.

Referring to FIG. 2, an annular collar 1, the circumference of which is approximately equal to the filter element A and adapter unit D, projects from and is an integral part of casing C and has a smaller collar 2 projecting axially from and surrounding the interior threaded bore 3 in casing C centrally positioned in relation to annular collar 1. By this construction a circular well 4 is formed between the collars 1 and 2 and with which port 5 formed in casing C communicates. The foregoing structural features of casing C are standard construction and requires no modification in order to have adapter unit D secured to it. In order to attach a screw type of filter, as represented by reference character A, to casing C, all that is necessary is to screw an externally threaded nipple into bore 3 and into the corresponding threaded bore formed in filter A.

However, in order to make provision for the cooler element B, by the interposition of adapter unit D, the nipple 6 had to be increased in length to accommodate the thickness of the adapter unit D.

The adapter unit D consists of a circular member 7, the circumference of which is substantially that of the annular collar 1, and it too has a smaller collar 8 centrally thereof with a bore 9 therethrough in coinciding relation to bore 3 of casing C. However, bore 9 is not threaded. A crescent shaped recess 10 is formed by collar 8 of member 7. A suitable gasket ring 11 fits into a recess provided for it in face 12 of adapter unit D. An L-shaped port 13 is formed through face 12 and side 14 of adapter unit D. Another port 15 is found in side 14 and communicates with the crescent shaped recess 10.

Nipple 6 has two sections of external threads and a stop nut 16 formed thereon. One of the threaded sections of the nipple 6 screws into bore 3 and the other threaded section screws into filter element A, as will be pointed out shortly.

When adapter unit D is to be mated and secured to casing C, nipple 6 is inserted into bore 9 so that face 12 of adapter unit D will come into contact with the annular collar 1 of casing C. When the nipple is screwed into bore 3 and tightened there against by nut portion 16, the pressure created on gasket 11 will assure a leak-proof relationship therebetween and prevent leakage of any fluid in the circular well 4.

The filter element A is representative of any standard type of screw filter commonly employed in filtering fluids used in lubrication and hydraulic systems in engines and other types of units already referred to. It has an internally threaded bore 17 into which the remaining externally threaded portion of the nipple 6 fits, and also a suitable gasket 18 which is sealable against the circular face 14' of adapter unit D. When the filter element A is tightly screwed about nipple 6, a liquid tight relationship is established and the crescent shaped recess 10 forms a fluid carrying reservoir, as will shortly become evident.

It was pointed out before that adapter unit D was provided with an L-shaped port 13 and a port 15 communicating directly with recess 10. A tube 20, surrounded by appropriate fins to remove heat and representative of the cooler element designated by reference character B, has its free ends 21 and 22 secured respective to ports 13 and 15 by any well recognized means.

A notched ear 23 extends from the periphery of member 7 and is secured to casing C against displacement by any desirable means, as by a nut and bolt 24.

Modus operandi

The fluid from casing C flows through the assembled elements A, B and D in the following manner, with assistance of the arrows shown in the drawings: Hot fluid is brought from the discharge side of the fluid circulation and pressure pump (not shown) and forced through the port 5 into well 4. The fluid then flows into the cooling element B through L-shaped port 13 to which end 21 is connected, where it is continuously cooled by radiation from the fins. The fluid continues to flow in the tube and subsequently deposits it through end 22 connected to port 15, into crescent shaped recess 10. It is then forced to pass upwardly through the small openings 19 of the filter element A, and then to percolate downwardly through nipple 6 into the fluid reservoir of casing C, after being cooled and filtered and with its qualities unimpaired and available for repeating its continuous cycle of operation as stated above.

The simplicity and advantages of the adapter unit heretofore described undoubtedly will be clear to those skilled in the art without further detailed description; and while the drawing shows one embodiment of the invention and the salient features thereof, only by way of example, it is quite possible that changes may be made in the details of construction of which, nevertheless, will come within the scope of this invention, and therefore I do not wish to limit myself to the disclosure shown and described herein except as specified in the following claim, in which:

I claim:
1. The combination in a closed circuit fluid system having a fluid chamber, and a screw type of filter, an adapter permitting the inter-arrangement of a cooling element with the filter and fluid reservoir comprising:
 a body member adapted for securable mating to the filter and fluid chamber, including therein a bore positioned centrally thereof in coinciding relation to that in the fluid chamber,
 a semi-circular recess formed around said bore, said recess being in communication with the filter when said body member and said filter are secured to each other,
 a port through the side of the body member in direct communication with the recess in the body member, and
 an L-shaped intake port formed through the same side of the body member and through one of its walls, said port being in communication with the fluid chamber, both of said ports being connected to a cooling element.

References Cited
UNITED STATES PATENTS

| | | | |
|---|---|---|---|
| 2,068,395 | 1/1937 | Burckhalter et al. | 210—181 |
| 2,348,247 | 5/1944 | Dushane | 210—186 |
| 3,300,049 | 1/1967 | Hardcastle | 210—232 |

REUBEN FRIEDMAN, Primary Examiner

JOHN ADEE, Assistant Examiner

U.S. Cl. X.R.

210—181, 186